US012427687B2

(12) United States Patent
Torrenga et al.

(10) Patent No.: US 12,427,687 B2
(45) Date of Patent: Sep. 30, 2025

(54) PROFILE SCANNER AND FEED ASSEMBLY FOR A HIGH-SPEED FOOD SLICING APPARATUS

(71) Applicant: Provisur Technologies, Inc., Chicago, IL (US)

(72) Inventors: Ryan Michael Torrenga, Bourbonnais, IL (US); Michael Scott Severns, Naperville, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 484 days.

(21) Appl. No.: 18/048,988

(22) Filed: Oct. 24, 2022

(65) Prior Publication Data

US 2023/0126080 A1 Apr. 27, 2023

Related U.S. Application Data

(60) Provisional application No. 63/271,459, filed on Oct. 25, 2021.

(51) Int. Cl.
*B26D 5/00* (2006.01)
*B26D 1/00* (2006.01)
(Continued)

(52) U.S. Cl.
CPC ......... *B26D 7/2614* (2013.01); *B26D 1/0006* (2013.01); *B26D 1/06* (2013.01);
(Continued)

(58) Field of Classification Search
CPC ...... B26D 7/2614; B26D 7/01; B26D 7/0608; B26D 7/0625; B26D 7/0633; B26D 7/32;
(Continued)

(56) References Cited

U.S. PATENT DOCUMENTS 2,036,012 A 3/1936 Bellinghausen
2,347,818 A 5/1944 Folk
(Continued)

FOREIGN PATENT DOCUMENTS

AU 200111314 A1 5/2001
AU 2013202066 A1 10/2013
(Continued)

OTHER PUBLICATIONS

International Search Report and Written Opinion for PCT/US2022/047623 mailed dated Apr. 17, 2023, 58 pages.

*Primary Examiner* — Omar Flores Sanchez
(74) *Attorney, Agent, or Firm* — Klintworth & Rozenblat LLP

(57) ABSTRACT

A food slicing includes a forward conveyor assembly located proximal to the blade assembly and a rearward conveyor assembly configured to transport the food product to the forward conveyor assembly. The rearward conveyor assembly is located immediately upstream from the forward conveyor assembly and gap is formed laterally between the forward conveyor assembly and the rearward conveyor assembly, in the longitudinal direction. An upper scanner unit proximal the gap scans an upper surface of the food product while a lower scanner unit located below the forward and rearward conveyor assemblies scans a lower surface of the food product as the food product passes across the gap, to obtain contour information of the lower surface of the food product.

20 Claims, 7 Drawing Sheets

(51) Int. Cl.

| | |
|---|---|
| ***B26D 1/06*** | (2006.01) |
| ***B26D 5/22*** | (2006.01) |
| ***B26D 5/42*** | (2006.01) |
| ***B26D 7/01*** | (2006.01) |
| ***B26D 7/06*** | (2006.01) |
| ***B26D 7/26*** | (2006.01) |
| ***B26D 7/32*** | (2006.01) |
| *B26D 1/28* | (2006.01) |
| *B26D 7/00* | (2006.01) |

(52) U.S. Cl.

CPC ............... *B26D 5/007* (2013.01); *B26D 5/22* (2013.01); *B26D 5/42* (2013.01); *B26D 7/01* (2013.01); *B26D 7/0608* (2013.01); *B26D 7/0625* (2013.01); *B26D 7/0633* (2013.01); *B26D 7/0641* (2013.01); *B26D 7/32* (2013.01); *B26D 2001/0013* (2013.01); *B26D 2001/0046* (2013.01); *B26D 1/28* (2013.01); *B26D 2007/0018* (2013.01); *B26D 2210/02* (2013.01)

(58) Field of Classification Search

CPC ........ B26D 1/0006; B26D 1/06; B26D 5/007; B26D 5/22; B26D 5/42

See application file for complete search history.

(56) References Cited

U.S. PATENT DOCUMENTS

| | | | | |
|---|---|---|---|---|
| 2,714,574 | A | 8/1955 | Kearney | |
| 3,080,784 | A | 3/1963 | Max | |
| 3,105,433 | A | 10/1963 | Yerex et al. | |
| 3,179,039 | A | 4/1965 | Christensen | |
| 3,667,521 | A | 6/1972 | Beasley | |
| 3,842,260 | A | 10/1974 | Christensen et al. | |
| 3,846,958 | A | 11/1974 | Divan | |
| 3,892,156 | A | 7/1975 | Johnstone | |
| 3,894,457 | A | 7/1975 | Miller et al. | |
| 3,901,140 | A | 8/1975 | Dohm, Jr. | |
| 3,982,299 | A | 9/1976 | Kompan | |
| 3,990,336 | A | 11/1976 | Soodalter | |
| 4,119,004 | A | 10/1978 | Ludwig | |
| 4,179,985 | A | 12/1979 | Baker et al. | |
| 4,196,561 | A | 4/1980 | Kruse | |
| 4,557,019 | A | 12/1985 | Van Devanter et al. | |
| 4,651,384 | A | 3/1987 | Korhonen | |
| 4,815,919 | A | 3/1989 | Juravic | |
| 4,962,568 | A | 10/1990 | Rudy et al. | |
| 4,967,652 | A | 11/1990 | Mally | |
| 5,048,719 | A | 9/1991 | Empl et al. | |
| 5,054,345 | A | 10/1991 | Weber | |
| 5,056,648 | A | 10/1991 | Huber et al. | |
| 5,064,667 | A | 11/1991 | Mally | |
| 5,117,717 | A | 6/1992 | Mally | |
| 5,146,827 | A | 9/1992 | Komatsu et al. | |
| 5,152,208 | A | 10/1992 | Ruetschle et al. | |
| 5,186,090 | A | 2/1993 | Bunch, Jr. | |
| 5,201,259 | A | 4/1993 | Covert et al. | |
| 5,241,887 | A | 9/1993 | Wolff et al. | |
| 5,249,491 | A | 10/1993 | Carter | |
| 5,267,168 | A | 11/1993 | Antonissen et al. | |
| 5,271,304 | A | 12/1993 | Wygal et al. | |
| 5,314,375 | A | 5/1994 | O'Brien et al. | |
| 5,324,228 | A | 6/1994 | Vogeley, Jr. | |
| 5,334,084 | A | 8/1994 | O'Brien et al. | |
| 5,343,791 | A | 9/1994 | Julian et al. | |
| 5,410,954 | A | 5/1995 | Wygal et al. | |
| 5,423,250 | A | 6/1995 | Anderson et al. | |
| 5,423,657 | A | 6/1995 | Frost et al. | |
| 5,429,548 | A | 7/1995 | Long et al. | |
| 5,431,935 | A | 7/1995 | Carey | |
| 5,470,274 | A | 11/1995 | Kadi et al. | |
| 5,481,466 | A | 1/1996 | Carey | |
| 5,482,166 | A | 1/1996 | Brown | |
| 5,580,599 | A | 12/1996 | Fehr | |
| 5,668,634 | A | 9/1997 | Newman | |
| 5,720,593 | A | 2/1998 | Pleake | |
| 5,727,997 | A | 3/1998 | Dufour et al. | |
| 5,784,937 | A | 7/1998 | Wygal et al. | |
| 5,832,802 | A | 11/1998 | Warthen et al. | |
| 5,902,177 | A | 5/1999 | Tessier et al. | |
| 5,944,598 | A | 8/1999 | Tong et al. | |
| 5,974,925 | A | 11/1999 | Lindee et al. | |
| 6,123,004 | A | 9/2000 | Matz | |
| 6,129,625 | A | 10/2000 | Cate et al. | |
| 6,186,059 | B1 | 2/2001 | Mello et al. | |
| 6,189,059 | B1 | 2/2001 | Sotek et al. | |
| 6,198,834 | B1 | 3/2001 | Belk et al. | |
| 6,253,651 | B1 | 7/2001 | Bessemer | |
| 6,407,818 | B1 * | 6/2002 | Whitehouse | G01B 11/00 356/627 |
| 6,511,370 | B1 | 1/2003 | Mello et al. | |
| 6,601,499 | B1 | 8/2003 | Bifulco | |
| 6,604,991 | B1 | 8/2003 | Jurs et al. | |
| 6,606,927 | B1 | 8/2003 | Lisec | |
| 6,692,345 | B1 | 2/2004 | Kruger | |
| 6,837,030 | B2 | 1/2005 | Drebing et al. | |
| 6,859,282 | B1 | 2/2005 | Weber et al. | |
| 6,860,804 | B2 | 3/2005 | Kruger | |
| 6,882,434 | B1 * | 4/2005 | Sandberg | A22C 17/0033 250/559.22 |
| 6,931,973 | B2 | 8/2005 | Kuchler | |
| 6,997,089 | B2 | 2/2006 | Lindee et al. | |
| 7,052,388 | B2 | 5/2006 | Houtz | |
| 7,055,419 | B2 | 6/2006 | Sandberg | |
| 7,156,730 | B1 | 1/2007 | Blaine | |
| 7,251,537 | B1 | 7/2007 | Blaine et al. | |
| 7,364,504 | B2 | 4/2008 | Gasbarro | |
| 7,373,217 | B2 | 5/2008 | Young | |
| 7,399,220 | B2 | 7/2008 | Kriesel et al. | |
| 7,404,759 | B2 | 7/2008 | Sato | |
| 7,450,247 | B2 | 11/2008 | Sandberg et al. | |
| 7,452,266 | B2 | 11/2008 | Bottemiller | |
| 7,500,550 | B2 | 3/2009 | Strong et al. | |
| 7,621,806 | B2 | 11/2009 | Bottemiller et al. | |
| 7,623,249 | B2 | 11/2009 | Sandberg et al. | |
| 7,651,388 | B2 | 1/2010 | Faires et al. | |
| 7,684,030 | B2 * | 3/2010 | Berube | G01N 21/15 356/237.1 |
| 7,698,977 | B2 | 4/2010 | Culling | |
| 7,715,935 | B2 | 5/2010 | Vogeley, Jr. et al. | |
| 7,747,042 | B2 | 6/2010 | Blaine | |
| 7,841,264 | B2 | 11/2010 | Kim et al. | |
| 7,918,718 | B2 | 4/2011 | Christensen et al. | |
| 7,949,414 | B2 | 5/2011 | Blaine et al. | |
| 8,016,649 | B2 | 9/2011 | Schimitzek | |
| 8,025,000 | B2 | 9/2011 | Kim et al. | |
| 8,096,860 | B2 | 1/2012 | Bolte et al. | |
| 8,109,065 | B2 | 2/2012 | Drebing et al. | |
| 8,116,554 | B2 | 2/2012 | Burton | |
| 8,166,856 | B2 | 5/2012 | Kim et al. | |
| 8,373,749 | B2 * | 2/2013 | Burton | G06T 7/0004 83/73 |
| 8,404,069 | B2 | 3/2013 | Douglas | |
| 8,495,938 | B2 | 7/2013 | Weber | |
| 8,517,806 | B2 | 8/2013 | Fillenworth et al. | |
| 8,529,321 | B2 | 9/2013 | Weber | |
| 8,643,851 | B2 * | 2/2014 | Weber | B26D 3/283 356/615 |
| 8,651,000 | B2 | 2/2014 | Weber | |
| 8,679,565 | B2 | 3/2014 | Finkowski | |
| 8,683,903 | B2 * | 4/2014 | Strong | B26D 7/0625 198/626.4 |
| 8,688,267 | B2 | 4/2014 | Blaine et al. | |
| 8,721,405 | B2 | 5/2014 | McKenna et al. | |
| 8,740,541 | B2 | 6/2014 | Pryor et al. | |
| 8,755,051 | B2 | 6/2014 | Thiedig | |
| 8,758,099 | B2 | 6/2014 | Reifenhaeuser | |
| 8,862,262 | B2 | 10/2014 | Thorsson et al. | |
| 8,869,664 | B2 | 10/2014 | Eyles et al. | |
| 8,892,239 | B2 | 11/2014 | Weber | |
| 8,893,599 | B2 | 11/2014 | Reifenhaeuser | |

(56) References Cited

U.S. PATENT DOCUMENTS

| | | | | |
|---|---|---|---|---|
| 8,968,808 | B1 | 3/2015 | Kunert et al. | |
| 8,986,080 | B2 | 3/2015 | Black et al. | |
| 8,997,969 | B2 | 4/2015 | Plakolm | |
| 9,061,432 | B2 | 6/2015 | Reifenhaeuser | |
| 9,091,673 | B2 | 7/2015 | Fern et al. | |
| 9,095,147 | B2 | 8/2015 | Hjalmarsson et al. | |
| 9,198,442 | B2 | 12/2015 | Peters et al. | |
| 9,247,755 | B1 | 2/2016 | Andre et al. | |
| 9,272,428 | B2 | 3/2016 | Mueller et al. | |
| 9,285,213 | B2 * | 3/2016 | Lindee | G01B 11/2545 |
| 9,351,498 | B2 | 5/2016 | Grimm et al. | |
| 9,386,780 | B2 | 7/2016 | Soncini | |
| 9,424,061 | B2 | 8/2016 | Freimuth et al. | |
| 9,427,014 | B2 | 8/2016 | Graham et al. | |
| 9,526,257 | B1 | 12/2016 | Farrant et al. | |
| 9,538,768 | B2 | 1/2017 | Dunivan | |
| 9,561,913 | B2 | 2/2017 | Briel et al. | |
| 9,597,812 | B2 | 3/2017 | Schmeiser | |
| 9,700,060 | B2 | 7/2017 | Inoue et al. | |
| 9,737,942 | B2 | 8/2017 | Nispel | |
| 9,770,838 | B2 | 9/2017 | Kim et al. | |
| 9,778,651 | B2 | 10/2017 | Strong et al. | |
| 9,828,185 | B1 | 11/2017 | Talken et al. | |
| 9,888,696 | B2 | 2/2018 | Lindee et al. | |
| 9,913,483 | B2 | 3/2018 | Vuholm et al. | |
| 9,927,377 | B2 * | 3/2018 | Mills | G01N 33/025 |
| 9,962,782 | B2 | 5/2018 | Nispel | |
| 9,999,985 | B2 | 6/2018 | Middleton et al. | |
| 10,040,213 | B2 | 8/2018 | Nielsen | |
| 10,065,335 | B2 | 9/2018 | Mayer et al. | |
| 10,245,742 | B2 | 4/2019 | Foreman et al. | |
| 10,245,745 | B2 | 4/2019 | Volkl et al. | |
| 10,315,326 | B2 | 6/2019 | Achenbach et al. | |
| 10,492,504 | B2 | 12/2019 | Volkl et al. | |
| 10,493,648 | B2 | 12/2019 | Nakatsu | |
| 10,510,204 | B2 | 12/2019 | Castellano | |
| 10,538,009 | B2 | 1/2020 | Schmeiser et al. | |
| 10,654,185 | B2 | 5/2020 | Blaine et al. | |
| 10,661,466 | B2 | 5/2020 | Mayer et al. | |
| 10,682,781 | B2 | 6/2020 | Perini | |
| 10,695,931 | B2 | 6/2020 | Perini | |
| 10,695,932 | B2 | 6/2020 | Burk et al. | |
| 10,710,259 | B2 | 7/2020 | Völkl et al. | |
| 10,759,071 | B2 | 9/2020 | Chan | |
| 10,836,063 | B2 | 11/2020 | Mayer et al. | |
| 10,843,362 | B2 | 11/2020 | Grasselli | |
| 10,843,364 | B2 | 11/2020 | Volkl et al. | |
| 10,850,416 | B2 | 12/2020 | Schmeiser et al. | |
| 10,863,751 | B2 | 12/2020 | Blaine | |
| 10,869,489 | B2 | 12/2020 | Blaine et al. | |
| 10,875,207 | B2 | 12/2020 | Volkl et al. | |
| 11,009,472 | B2 | 5/2021 | Von Keudell et al. | |
| 11,014,257 | B2 | 5/2021 | Sunter et al. | |
| 11,202,452 | B2 | 12/2021 | Hofmann et al. | |
| 11,540,524 | B2 * | 1/2023 | Lanzky | B26D 5/32 |
| 12,227,367 | B2 * | 2/2025 | Seager | B26D 7/0625 |
| 2001/0036807 | A1 | 11/2001 | Veldkamp et al. | |
| 2002/0004366 | A1 | 1/2002 | Thorvaldsson et al. | |
| 2003/0008608 | A1 | 1/2003 | Scalia et al. | |
| 2004/0029514 | A1 | 2/2004 | Kruger | |
| 2004/0108645 | A1 | 6/2004 | Lindelof et al. | |
| 2004/0194605 | A1 | 10/2004 | Weber | |
| 2004/0200365 | A1 | 10/2004 | Young | |
| 2004/0231526 | A1 | 11/2004 | Childress et al. | |
| 2005/0032471 | A1 | 2/2005 | Pfarr et al. | |
| 2005/0085176 | A1 | 4/2005 | Houtz | |
| 2005/0120844 | A1 * | 6/2005 | Weber | B26D 5/007 83/76.8 |
| 2005/0188657 | A1 | 9/2005 | Drebing et al. | |
| 2005/0199111 | A1 | 9/2005 | Sandberg et al. | |
| 2006/0154587 | A1 | 7/2006 | Mikkelsen et al. | |
| 2006/0156878 | A1 | 7/2006 | Faires et al. | |
| 2006/0162515 | A1 | 7/2006 | Vogeley et al. | |
| 2006/0171581 | A1 | 8/2006 | Blaine | |
| 2006/0205335 | A1 | 9/2006 | Bifulco | |
| 2006/0219069 | A1 | 10/2006 | Skaar et al. | |
| 2007/0028742 | A1 | 2/2007 | Mueller et al. | |
| 2007/0193425 | A1 | 8/2007 | Weber | |
| 2007/0202229 | A1 | 8/2007 | Nielsen | |
| 2007/0264397 | A1 | 11/2007 | Mather et al. | |
| 2008/0016999 | A1 | 1/2008 | Mathues et al. | |
| 2008/0200107 | A1 | 8/2008 | Christensen et al. | |
| 2008/0212842 | A1 | 9/2008 | Burton | |
| 2008/0281461 | A1 | 11/2008 | Blaine et al. | |
| 2009/0035434 | A1 | 2/2009 | Sverrisson et al. | |
| 2009/0038455 | A1 | 2/2009 | Strong et al. | |
| 2009/0064833 | A1 | 3/2009 | Sandberg et al. | |
| 2009/0120256 | A1 * | 5/2009 | Pasek | B26D 1/165 83/424 |
| 2009/0137195 | A1 | 5/2009 | Bottemiller et al. | |
| 2009/0246333 | A1 | 10/2009 | Groneberg et al. | |
| 2009/0294246 | A1 | 12/2009 | Pogue | |
| 2010/0066824 | A1 | 3/2010 | Burton | |
| 2010/0116107 | A1 | 5/2010 | Spillner et al. | |
| 2010/0170373 | A1 | 7/2010 | Green | |
| 2010/0179684 | A1 | 7/2010 | Blaine et al. | |
| 2010/0267320 | A1 | 10/2010 | Weber | |
| 2010/0304652 | A1 | 12/2010 | Bolte et al. | |
| 2010/0307303 | A1 | 12/2010 | Weber | |
| 2011/0111682 | A1 | 5/2011 | Schimitzek | |
| 2011/0126679 | A1 | 6/2011 | Weber | |
| 2011/0126680 | A1 | 6/2011 | Weber | |
| 2011/0150604 | A1 | 6/2011 | Marsh et al. | |
| 2011/0154969 | A1 * | 6/2011 | Weber | A22C 17/0086 83/520 |
| 2011/0179922 | A1 | 7/2011 | Weber | |
| 2011/0185865 | A1 | 8/2011 | Weber | |
| 2011/0203434 | A1 | 8/2011 | Reifenhaeuser | |
| 2011/0247466 | A1 | 10/2011 | Weber | |
| 2011/0247470 | A1 | 10/2011 | Weber | |
| 2011/0265621 | A1 | 11/2011 | Schmidt | |
| 2011/0311700 | A1 | 12/2011 | Shah et al. | |
| 2012/0018353 | A1 | 1/2012 | McKenna et al. | |
| 2012/0040597 | A1 | 2/2012 | Fern et al. | |
| 2012/0060659 | A1 | 3/2012 | Weber | |
| 2012/0073415 | A1 | 3/2012 | Maidel et al. | |
| 2012/0115406 | A1 | 5/2012 | Fillenworth et al. | |
| 2012/0137844 | A1 | 6/2012 | Weber | |
| 2012/0137845 | A1 | 6/2012 | Weber | |
| 2012/0198974 | A1 | 8/2012 | Weber | |
| 2012/0198975 | A1 | 8/2012 | Lindee | |
| 2012/0212603 | A1 | 8/2012 | Lindee et al. | |
| 2013/0068076 | A1 | 3/2013 | Schmeiser et al. | |
| 2013/0074667 | A1 | 3/2013 | Weber et al. | |
| 2013/0133490 | A1 | 5/2013 | Schmeiser et al. | |
| 2013/0260660 | A1 | 10/2013 | Reifenhaeuser | |
| 2014/0174891 | A1 | 6/2014 | Mayer | |
| 2014/0338509 | A1 | 11/2014 | Lindee et al. | |
| 2015/0093488 | A1 | 4/2015 | Gutmann et al. | |
| 2015/0122100 | A1 | 5/2015 | Schmeiser | |
| 2015/0150272 | A1 | 6/2015 | Peters et al. | |
| 2015/0190939 | A1 | 7/2015 | Gerlach et al. | |
| 2015/0205288 | A1 | 7/2015 | Strong et al. | |
| 2015/0216192 | A1 | 8/2015 | Jacobsen et al. | |
| 2015/0290827 | A1 | 10/2015 | Evans et al. | |
| 2015/0367523 | A1 | 12/2015 | Schmeiser et al. | |
| 2016/0031110 | A1 * | 2/2016 | Middleton | B26D 7/01 83/13 |
| 2016/0088852 | A1 | 3/2016 | Lindee et al. | |
| 2016/0207152 | A1 | 7/2016 | Weber | |
| 2017/0035066 | A1 | 2/2017 | Hukelmann | |
| 2017/0156354 | A1 | 6/2017 | Inoue et al. | |
| 2017/0196232 | A1 * | 7/2017 | Vuholm | G06T 7/13 |
| 2017/0210023 | A1 | 7/2017 | Hocker et al. | |
| 2017/0210569 | A1 * | 7/2017 | Dopp | B26D 1/28 |
| 2017/0212506 | A1 | 7/2017 | Pfarr et al. | |
| 2017/0217044 | A1 | 8/2017 | Blaine | |
| 2017/0245509 | A1 | 8/2017 | Petersen et al. | |
| 2017/0320225 | A1 | 11/2017 | Fox et al. | |
| 2017/0368707 | A1 | 12/2017 | Keller | |
| 2018/0027848 | A1 | 2/2018 | Blaine et al. | |
| 2018/0029246 | A1 | 2/2018 | Blaine et al. | |
| 2018/0158537 | A1 | 6/2018 | Blaine | |
| 2018/0207896 | A1 | 7/2018 | Olson et al. | |

(56) References Cited

U.S. PATENT DOCUMENTS

2019/0009421 A1* 1/2019 Grasselli ................ B26D 5/007
2019/0152084 A1* 5/2019 Schmeiser ............... B26D 5/34
2020/0068908 A1 3/2020 Blaine
2020/0068909 A1 3/2020 Blaine et al.
2020/0108520 A1 4/2020 Pryor et al.
2020/0238556 A1 7/2020 Blaine et al.
2020/0269459 A1 8/2020 Fox et al.
2020/0315191 A1 10/2020 Hofmann et al.
2020/0338777 A1 10/2020 Beliveau et al.
2021/0001507 A1 1/2021 Zambarda
2021/0092968 A1 4/2021 Blaine
2021/0227840 A1* 7/2021 Blaine .................... B26D 5/007
2023/0129471 A1 4/2023 Torrenga et al.
2023/0211517 A1 7/2023 Su et al.
2024/0058981 A1 2/2024 Stachel
2024/0399602 A1* 12/2024 Kamsteeg ............. B65B 25/068

FOREIGN PATENT DOCUMENTS

AU 2013301673 B2 12/2016
AU 2012267912 B2 12/2019
CA 2039045 A1 9/1991
CA 2006994 C 9/1992
CA 2133953 A1 11/1993
CA 1328856 C 4/1994
CA 2158625 A1 3/1996
CA 2377198 A1 9/2002
CA 2200545 C 1/2003
CA 2525674 A1 12/2004
CA 2531621 A1 6/2006
CA 2531626 A1 6/2006
CA 2531857 A1 6/2006
CA 2541555 A1 10/2006
CA 2550972 A1 12/2006
CA 2664348 A1 5/2008
CA 2511654 C 6/2009
CA 2708216 A1 6/2009
CA 2767423 A1 1/2011
CA 2779326 A1 5/2011
CA 3013395 A1 5/2011
CA 2783818 A1 6/2011
CA 2738300 A1 10/2011
CA 2552307 C 1/2012
CA 2531852 C 2/2013
CA 2531863 C 2/2013
CA 2743418 C 4/2013
CA 2531895 C 8/2013
CA 2695808 C 11/2015
CA 2877448 C 10/2016
CA 2904958 A1 3/2017
CA 2706407 C 5/2017
CA 2531857 C 10/2017
CA 3032041 A1 2/2018
CA 2899291 C 3/2018
CA 2778724 C 9/2018
CA 3108061 A1 3/2020
CA 3032196 C 10/2020
CA 3137380 A1 11/2020
CN 105979784 A 9/2016
DE 2843388 A1 6/1979
DE 8128596 U1 3/1982
DE 3100901 A1 8/1982
DE 3544708 A1 6/1987
DE 68903375 T2 3/1993
DE 19917536 A1 10/2000
DE 10220006 A1 11/2003
DE 102004010696 A1 9/2005
DE 60305523 T2 8/2007
DE 102010011172 A1 9/2011
DE 102010021951 A1 12/2011
DE 102012107278 A1 2/2014
DE 102016003938 A1 10/2017
DE 102019110313 B3 7/2020
DK 201570224 A1 4/2015
EP 0101264 A2 2/1984
EP 0057478 B1 4/1986
EP 0332895 A2 9/1989
EP 341564 A1 11/1989
EP 0373844 A1 6/1990
EP 0449512 A1 10/1991
EP 0637278 A1 2/1995
EP 587870 B1 2/1996
EP 0377451 B1 4/1997
EP 690773 B1 2/1998
EP 1064518 A2 1/2001
EP 1174034 A1 1/2002
EP 1243386 A2 9/2002
EP 0971595 B1 2/2003
EP 1211944 B1 9/2004
EP 1429898 B1 5/2005
EP 1356906 B1 8/2005
EP 1626622 A2 2/2006
EP 1555882 B1 5/2006
EP 1289374 B1 7/2007
EP 2084968 A1 8/2009
EP 2094102 A1 9/2009
EP 1781110 B1 2/2010
EP 2210495 A1 7/2010
EP 2230920 A2 9/2010
EP 2266766 A2 12/2010
EP 1178878 B2 5/2011
EP 2352381 A2 8/2011
EP 2353391 A1 8/2011
EP 1583640 B1 10/2011
EP 1820614 B1 10/2011
EP 2258523 B1 11/2011
EP 1552912 B1 2/2012
EP 2190637 B1 2/2012
EP 2272640 B1 2/2012
EP 2452168 A1 5/2012
EP 2509454 A2 10/2012
EP 2450166 B1 11/2012
EP 2572840 A2 3/2013
EP 2572841 A2 3/2013
EP 2572842 A2 3/2013
EP 2625959 A2 8/2013
EP 2516118 B1 11/2013
EP 2664425 A2 11/2013
EP 2531038 B1 12/2013
EP 2644337 B1 3/2014
EP 1915240 B1 4/2014
EP 2029330 B1 4/2014
EP 2755018 A1 7/2014
EP 2618962 B1 8/2014
EP 2493765 B1 10/2014
EP 2809454 A1 12/2014
EP 2435220 B1 7/2015
EP 2537651 B1 10/2015
EP 2829372 B1 12/2015
EP 2341313 B1 3/2016
EP 2796255 B1 5/2016
EP 2835236 B1 6/2016
EP 3069836 A1 9/2016
EP 2359992 B2 12/2016
EP 2444213 B1 1/2017
EP 1534478 B1 3/2017
EP 2437920 B1 5/2017
EP 3170632 A1 5/2017
EP 3069835 B1 11/2017
EP 2315650 B1 12/2017
EP 3275313 A1 1/2018
EP 2439029 B1 4/2018
EP 2882296 B1 4/2018
EP 2885115 B1 4/2018
EP 3160241 B1 10/2018
EP 3386691 A1 10/2018
EP 2494307 B1 12/2018
EP 3483553 A1 5/2019
EP 3305696 B1 7/2019
EP 3224005 B1 8/2019
EP 3238898 B1 10/2019
EP 2414140 B1 11/2019
EP 1782929 B2 12/2019
EP 3578917 A1 12/2019

(56) References Cited

FOREIGN PATENT DOCUMENTS

| | | | |
|---|---|---|---|
| EP | 3332928 | B1 | 1/2020 |
| EP | 3424332 | B1 | 1/2020 |
| EP | 3392847 | B1 | 2/2020 |
| EP | 3689563 | A1 | 8/2020 |
| EP | 3448643 | B1 | 9/2020 |
| EP | 3448642 | B1 | 10/2020 |
| EP | 2895308 | B1 | 1/2021 |
| EP | 3760368 | A1 | 1/2021 |
| EP | 3490383 | B1 | 5/2021 |
| EP | 3174666 | B1 | 7/2021 |
| EP | 3843549 | A1 | 7/2021 |
| EP | 3386692 | B1 | 9/2021 |
| EP | 3888864 | A1 | 10/2021 |
| EP | 3900899 | A1 | 10/2021 |
| EP | 2844440 | B2 | 11/2021 |
| EP | 3448641 | B1 | 9/2022 |
| FR | 2737479 | A1 | 2/1997 |
| GB | 483604 | A | 4/1938 |
| GB | 2075459 | B | 6/1984 |
| GB | 2364894 | A | 2/2002 |
| GB | 2377362 | A | 1/2003 |
| JP | 2007522948 | A | 8/2007 |
| JP | 5025271 | B2 | 9/2012 |
| KR | 20100101880 | A | 9/2010 |
| KR | 101025501 | B1 | 4/2011 |
| KR | 20190005814 | A | 1/2019 |
| KR | 102018637 | B1 | 9/2019 |
| MX | 2017003541 | A | 10/2017 |
| WO | WO9322114 | A1 | 11/1993 |
| WO | WO9947885 | A2 | 9/1999 |
| WO | WO200062983 | A1 | 10/2000 |
| WO | WO0132369 | A1 | 5/2001 |
| WO | WO200328963 | A1 | 4/2003 |
| WO | WO200359585 | A2 | 7/2003 |
| WO | WO2004105519 | A2 | 12/2004 |
| WO | WO2004106020 | A1 | 12/2004 |
| WO | WO2006080033 | A1 | 8/2006 |
| WO | WO2006136814 | A1 | 12/2006 |
| WO | WO2007022782 | A2 | 3/2007 |
| WO | WO2007096363 | A1 | 8/2007 |
| WO | WO2008057732 | A1 | 5/2008 |
| WO | WO2009079173 | A2 | 6/2009 |
| WO | WO2010054332 | A2 | 5/2010 |
| WO | WO2011072187 | A2 | 6/2011 |
| WO | WO2012161577 | A1 | 11/2012 |
| WO | WO2013113518 | A1 | 8/2013 |
| WO | WO2013135264 | A1 | 9/2013 |
| WO | WO2013148322 | A1 | 10/2013 |
| WO | WO2014023626 | A2 | 2/2014 |
| WO | WO201460340 | A1 | 4/2014 |
| WO | WO2015092935 | A1 | 6/2015 |
| WO | WO2015114118 | A1 | 8/2015 |
| WO | WO2015193507 | A1 | 12/2015 |
| WO | WO2016045683 | A1 | 3/2016 |
| WO | WO2017133972 | A1 | 8/2017 |
| WO | WO2017186826 | A1 | 11/2017 |
| WO | WO2018111108 | A2 | 6/2018 |
| WO | WO2020046868 | A1 | 3/2020 |
| WO | WO2020212246 | A1 | 10/2020 |
| WO | WO2020225529 | A1 | 11/2020 |

* cited by examiner

PROFILE SCANNER AND FEED ASSEMBLY FOR A HIGH-SPEED FOOD SLICING APPARATUS

CROSS-REFERENCE TO RELATED APPLICATION

This application claims the priority of U.S. provisional application Ser. No. 63/271,459, filed on Oct. 25, 2021, the contents of which are incorporated herein in its entirety.

FIELD OF THE INVENTION

The present disclosure generally relates to an apparatus for slicing food products using a laser scanner to profile food product prior to slicing.

BACKGROUND

The present disclosure generally relates to an apparatus for slicing food products using a rotating blade, such as an involute blade. Food products, often in the form of a food "log" or a bacon belly slab, are fed in a forward direction by a feed assembly or conveyor system toward the slicing blade. A laser scanner is configured to continuously scan the food product as it is fed in the forward or downstream direction. Known scanning system typically scan the food product well upstream from the slicing blade or in a separate scanning unit. As the food product is fed toward the blade, due to the distance from the scanning unit to the blade, the food product tends to slightly shift position on the conveyor due to normal vibrations and changes in conveyor belt speed. This may to cause inaccuracies in the profile measurement with respect to the exact longitudinal position of the food product because the expected provide of the food product at the blade is not exactly the same profile as measured due to the aforementioned shifting of the food product. This is especially true in systems where the food product is merely resting on a lower conveyor belt and is free to move about, even though by a slight amount.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

SUMMARY

Figure 1:
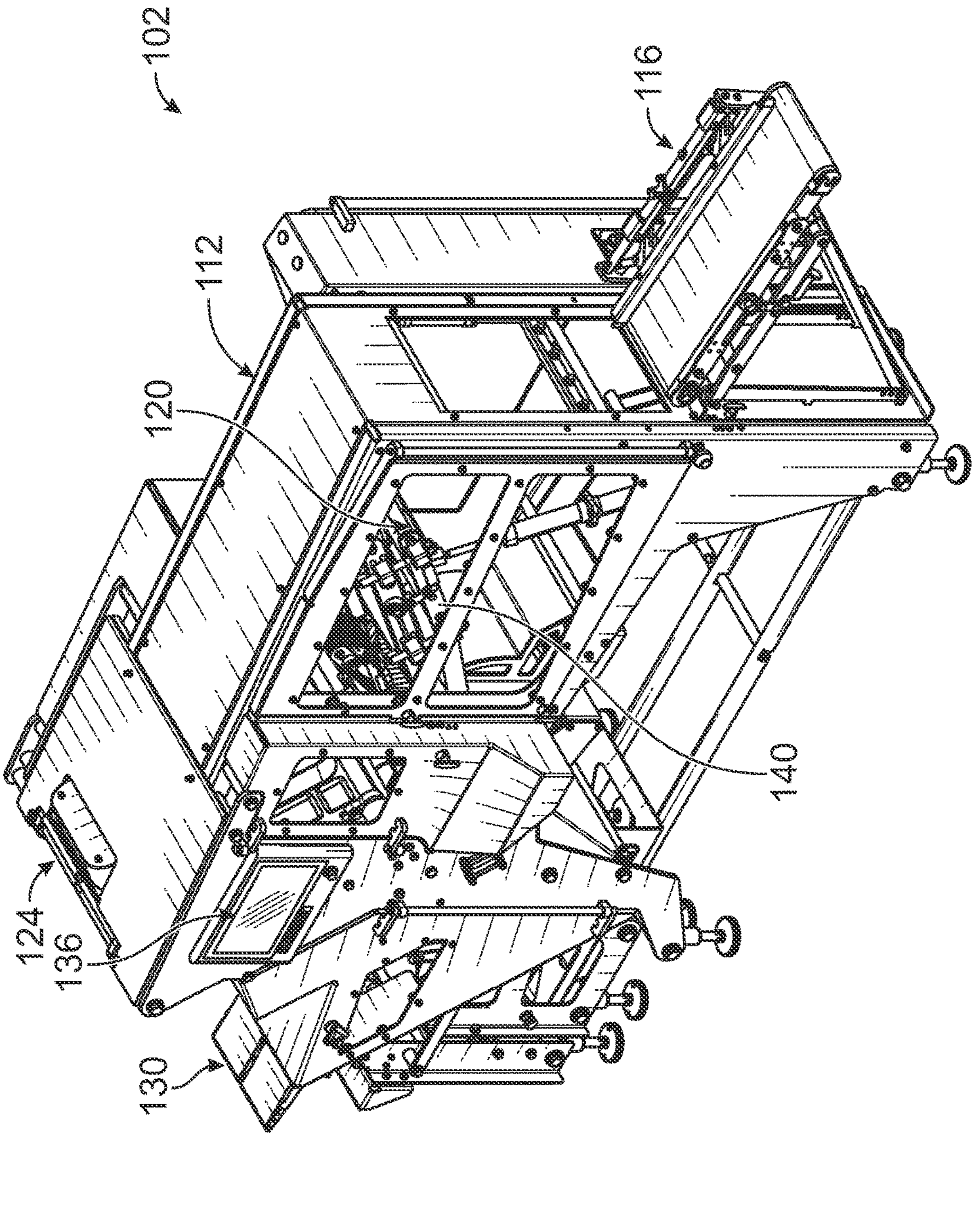
FIG. 1 is a perspective view of a food product slicing machine generally, according to one embodiment.

A food slicing system includes a frame, a blade assembly coupled to the frame and configured to slice a food product, and a forward conveyor assembly coupled to the frame and configured to transport the food product to the blade assembly to be sliced. The forward conveyor assembly is located proximal to the blade assembly. A rearward conveyor assembly is coupled to the frame and is configured to transport the food product to the forward conveyor assembly. The rearward conveyor assembly is located immediately upstream from the forward conveyor assembly, where gap is formed laterally between the forward conveyor assembly and the rearward conveyor assembly, in the longitudinal direction. A control system is configured to control and synchronize movement of the forward conveyor assembly and the rearward conveyor assembly. An upper scanner unit is located above the food product in a region proximal the gap and is configured to scan an upper surface of the food product to obtain contour information of the upper surface of the food product. Similarly, a lower scanner unit is located below the forward and rearward conveyor assemblies, and is located below the food product, in a region proximal the gap and configured to scan a lower surface of the food product as the food product passes across the gap, to obtain contour information of the lower surface of the food product. The control system is configured to receive the contour information from the upper scanner unit and the lower scanner unit and generate a profile of the food product.

DETAILED DESCRIPTION

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Food product slicing apparatuses are included in the present disclosure. With reference to the figures, one example of a food product slicing apparatus 102 is shown. The food product slicing apparatus 102 is used to slice food products into slices. The food products may include a wide variety of edible foodstuff including, but not limited to meat, such as pork bellies, beef, chicken, fish, etc., and cheese.

Figure 2:
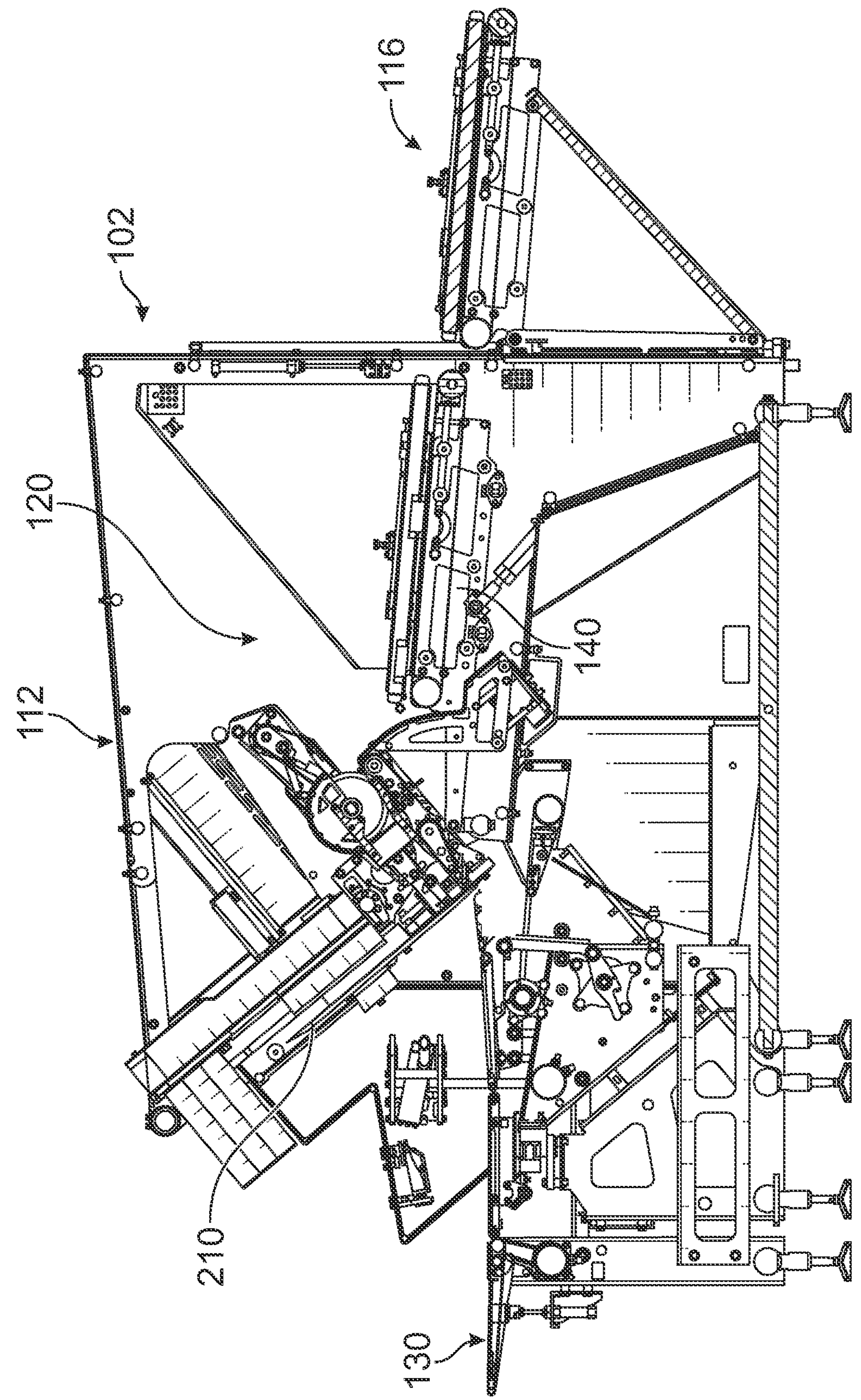
FIG. 2 is a side view of the food product slicing machine of FIG. 1, according to one embodiment.

As generally shown in FIGS. 1-2, the food product slicing apparatus 102 includes a main frame 112, a load assembly 116 mounted on the main frame 112, a feed assembly 120 mounted on the main frame 112 forward of the load assembly 116, a slicing assembly 124 mounted on the main frame 112 forward of the feed assembly 120, and an output assembly 130 mounted on the main frame 112 forward of the slicing assembly 124. The food product slicing apparatus 102 further includes a control system 136 configured to control operation of the components of the food product slicing apparatus 102. The main frame 112 supports the load assembly 116, the feed assembly 120, the slicing assembly 124, and the output assembly 130, on a ground surface and includes various mechanisms and power systems for powering the food product slicing apparatus 102.

The load assembly 116 and the feed assembly 120 are configured to support and handle the food products and to move the food products to the slicing assembly 124. The slicing assembly 124 is configured to slice the food products into individual slices. The sliced food product is supported on the output assembly 130, which is preferably a conveyor, in stacks or in shingles, which are transported away from the slicing assembly 124 in the downstream direction. The slicing assembly 124 includes a slicing blade 210, which may be a circular or involute blade. The control system 136 includes all the necessary hardware and software to perform all of the operations and functions of the food product slicing apparatus 102. The control system 136 may be mounted on the main frame 112 or may be remote from the main frame 112.

As shown in FIGS. 1-4, a forward or downstream conveyor assembly 310 immediately adjacent to the slicing assembly 124 feeds the food product to the blade 210, and may have an endless belt configuration. The forward conveyor assembly 310 is operatively coupled to or supported by the main frame 112, and is configured to transport the food product to the slicing assembly 124 to be sliced, and is located immediately adjacent the slicing assembly 124. The forward conveyor assembly 310 includes a lower forward conveyor 320 having an endless belt, a first upper forward conveyor 330, and a second upper forward conveyor 340.

Figure 3:
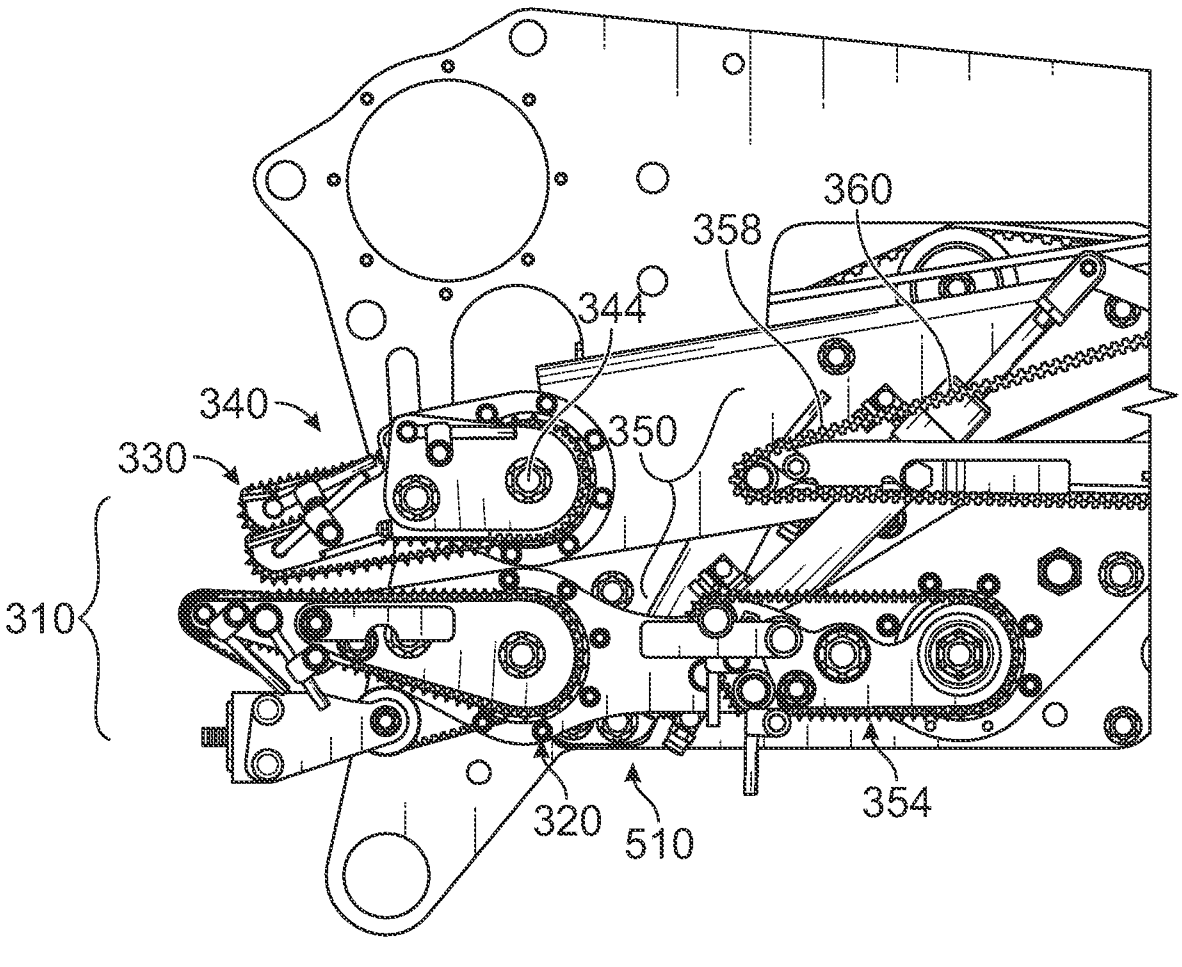
FIG. 3 is a side view of the forward and rearward conveyor assemblies of FIG. 2, according to one embodiment.
Figure 4:
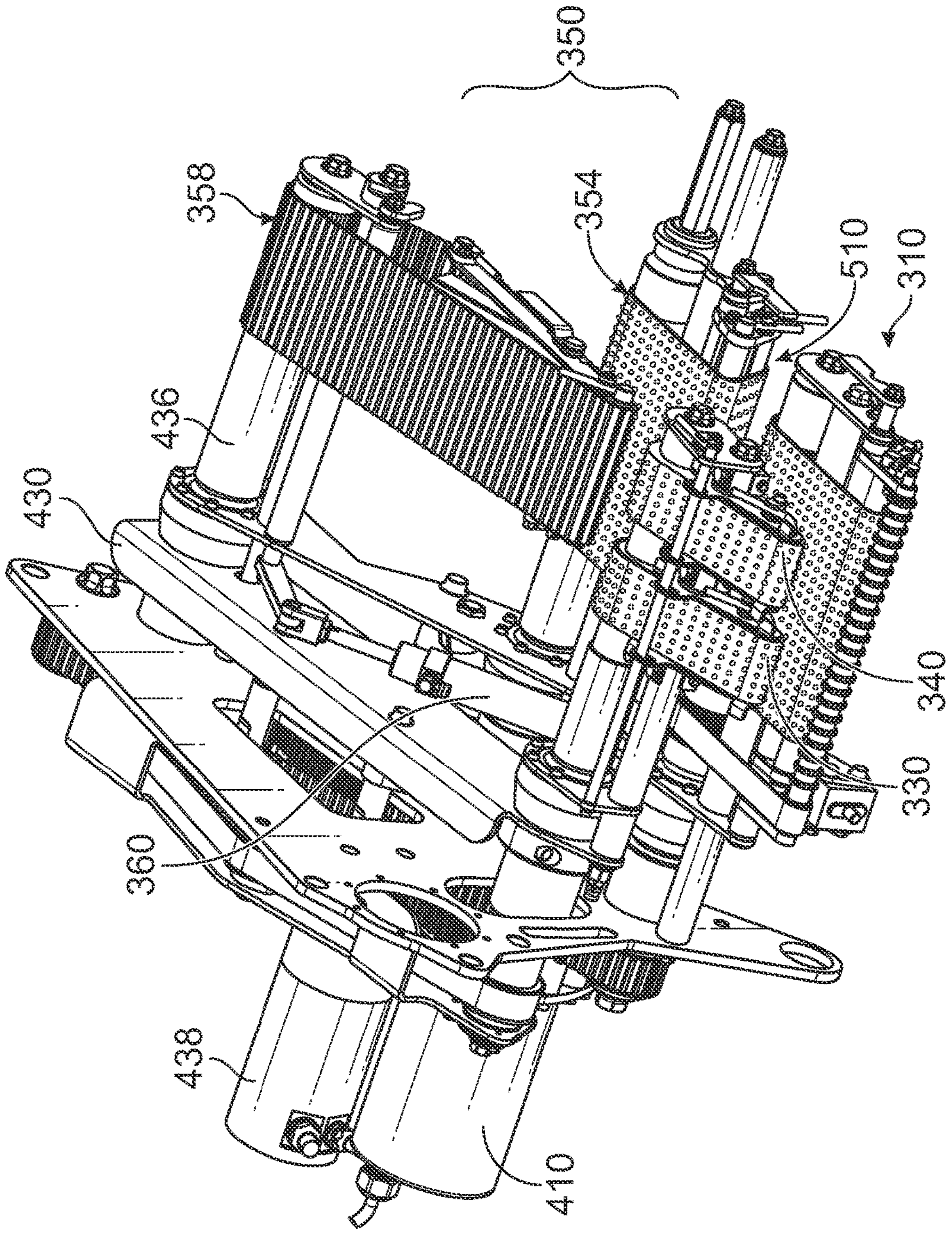
FIG. 4 is a perspective view of the forward and rearward conveyor assemblies of FIG. 3, according to one embodiment.

All conveyors are preferably endless belt types. As shown in FIGS. 3-4, and as shown in FIG. 4 in particular, two upper forward conveyors 334, 340 may exist in a side-by-side manner. The upper forward conveyors 330, 340 preferably pivot upwardly and downwardly about a forward upward conveyor pivot shaft 344 driven by a forward upward conveyor pivot motor 410. During up and down pivoting of the upper forward conveyors 330, 340, the spiked belt of such conveyors may be controlled to contact the upper surface of the food product, and depending on the operation performed, move out of contact with the upper surface of the food product. The first upper forward conveyor 330 and the second upper forward conveyor 340 may pivot independently from each other under control of the control system 136.

In addition to the pivoting movement of the first upper forward conveyor 330 and the second upper forward conveyor 340, the entire forward conveyor assembly 310 may pivot upwardly and downwardly on a forward conveyor assembly support plate 430. Such vertical pivoting of the entire forward conveyor assembly 310 permits the forward conveyor assembly 310 to pivot completely out of the way of the food product in the vertical direction.

A rearward or upstream conveyor assembly 350 receives the food product and transports the food product to the forward conveyor assembly 310. The rearward conveyor assembly 350 is operatively coupled to or supported by the main frame 112, and is configured to transport the food product to the forward conveyor assembly 310, and may also be an endless belt configuration. The rearward conveyor assembly 350 is located immediately upstream from the forward conveyor assembly 310.

The rearward or upstream conveyor assembly includes a lower rearward conveyor 354 and an upper rearward conveyor 358. The lower rearward conveyor 354 and the upper rearward conveyor 358 may each include an endless belt and preferably, the lower rearward conveyor 354 includes a spiked belt.

The upper rearward conveyor 358 preferably pivots upwardly and downwardly about a rearward upper conveyor pivot shaft 436 driven by a rearward upward conveyor pivot motor 438. During upward and downward pivoting of the upper rearward conveyor 358, the conveyor may be controlled to contact the upper surface of the food product, and depending on the operation performed, may be controlled to move out of contact with the upper surface of the food product.

In addition to the pivoting movement of the upper rearward conveyor 358, the entire rearward conveyor assembly 350 may pivot upwardly and downwardly on a rearward hydraulic arm assembly 360. Such vertical pivoting of the entire rearward conveyor assembly 350 permits the rearward conveyor assembly 350 to pivot completely out of the way of the food product in the vertical direction.

As best shown in FIGS. 1 and 2, a further upstream pivoting conveyor 140 is located upstream from the rearward conveyor assembly 350 and adjacent thereto, and similarly includes an endless belt. Food product from the load assembly 116 is fed to the upstream pivoting conveyor 140, and when the food product is in the proper location on the conveyor belt of the upstream pivoting conveyor 140, the upstream pivoting conveyor 140 tilts upwardly from a flat or almost flat position, which in its flat position, is essentially in line with the load assembly 116, as best shown in FIG. 2. In the upwardly tilted position best shown in FIG. 1, the upstream pivoting conveyor 140 is in alignment with the forward conveyor assembly 310 and the rearward conveyor assembly 350, and in this position, the food product is fed toward the blade 210 for slicing.

The control system 136 is configured to control and synchronize movement of the forward conveyor assembly 310 and the rearward conveyor assembly 350 with respect to starting, stopping, speed, acceleration. The control system 136 is also configured to control a pivoting and lifting motion of the upward forward conveyors 330, 340, upper rearward conveyor 358, and the upstream pivoting conveyor 140.

In operation, the lower forward conveyor 320 is configured to support a portion of the food product thereon. Depending on the length of the food product, the lower forward conveyor 320 may support the entire food product or only a portion of the food product. The upper forward conveyor is preferably located directly above the lower forward conveyor 320 in one embodiment, or may be offset by a predetermined longitudinal distance therefrom. In one embodiment described above, there are two side by side upper forward conveyors 330, 340. Each upward forward conveyor 330, 340 is configured to contact an upper surface of the food product. Thus, the lower forward conveyor 320 and the one or more upper forward conveyors contact the food product on bottom and top surfaces thereof, respectively, and transports the food product in the forward direction.

In operation, the lower rearward conveyor 354 is configured to support a portion of the food product thereon. The lower rearward conveyor 354 may include a spiked belt. Depending on the length of the food product, the lower rearward conveyor 354 may support the entire food product or only a portion of the food product, and may support the food product in cooperation with the pivoting conveyor 140 assembly. The upper rearward conveyor 358 is preferably located directly above the lower rearward conveyor 354 in one embodiment, or may be offset by a predetermined longitudinal distance. Accordingly, in one embodiment the lower rearward conveyor 354 may be longer than the upper rearward conveyor 358.

The upper rearward conveyor is configured to contact an upper surface of the food product. Thus, the lower rearward conveyor 354 and the upper rearward conveyor 358 contact the food product on bottom and top surfaces thereof, respectively, and transports the food product in the forward direction.

Figure 5:
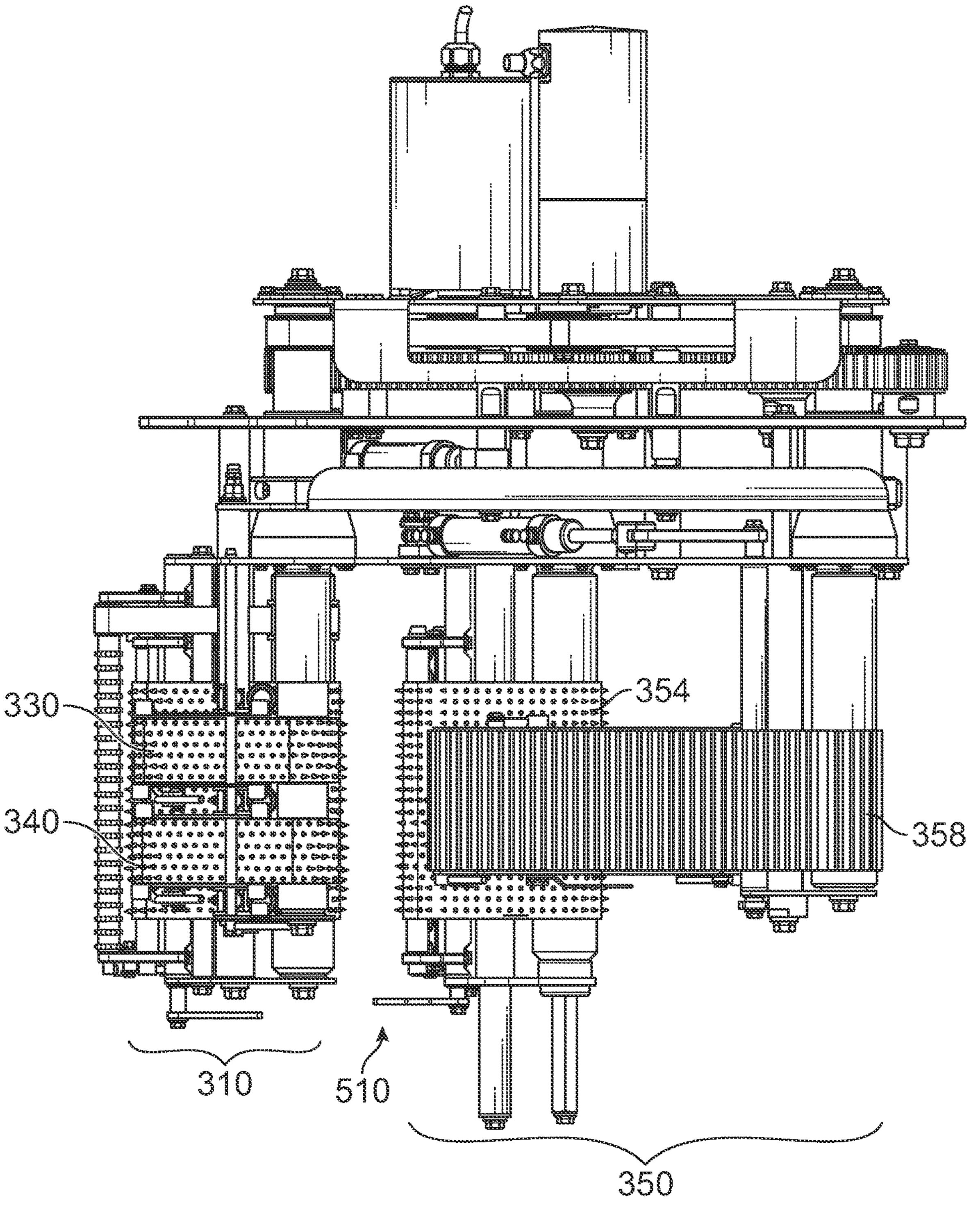
FIG. 5 is a top view of the forward and rearward conveyor assemblies of FIG. 4, according to one embodiment.
Figure 6:
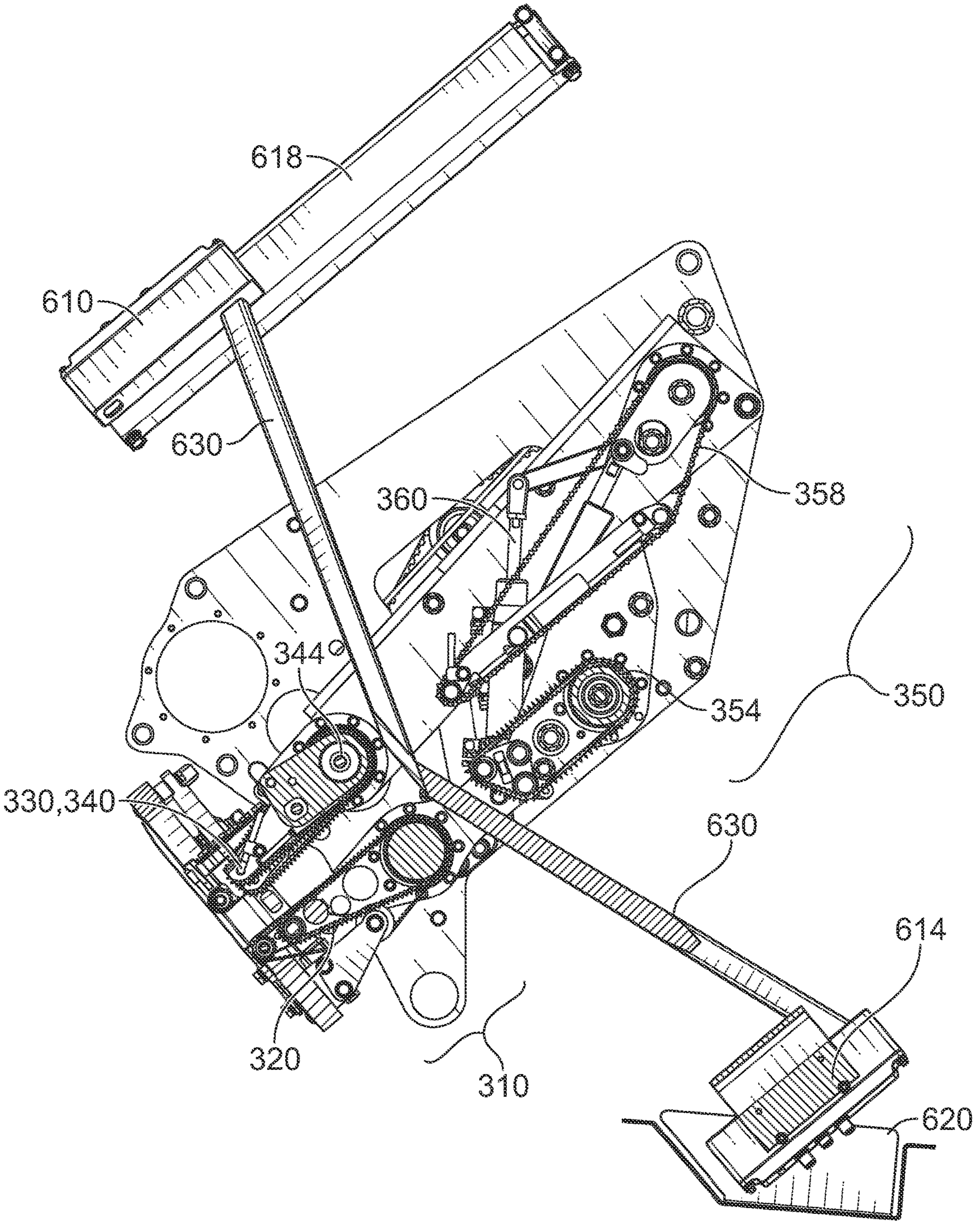
FIG. 6 is a side view of the forward and rearward conveyor assemblies of FIG. 3, particularly showing upper and lower laser scanning assemblies and a simulated representation of the laser beams, according to one embodiment.

As best shown in FIGS. 5 and 6 regarding the location of the forward conveyor assembly 310 relative to the rearward conveyor assembly 350, a small lateral gap 510 exists in the longitudinal direction between the forward conveyor assembly 310 and the rearward conveyor assembly 350, and more particularly, such gap 510 exists between the lower forward conveyor 320 and the lower rearward conveyor 354. This gap 510 exposes the bottom surface of the food product as the food product travels across the gap 510 during transport of the food product in the forward or downstream direction.

The endless belts that form the upper forward conveyor, the lower forward conveyor 320, the upper rearward conveyor 358, and the lower rearward conveyor 354, may be of known configuration and may be smooth or spiked for additional gripping function.

Figure 7:
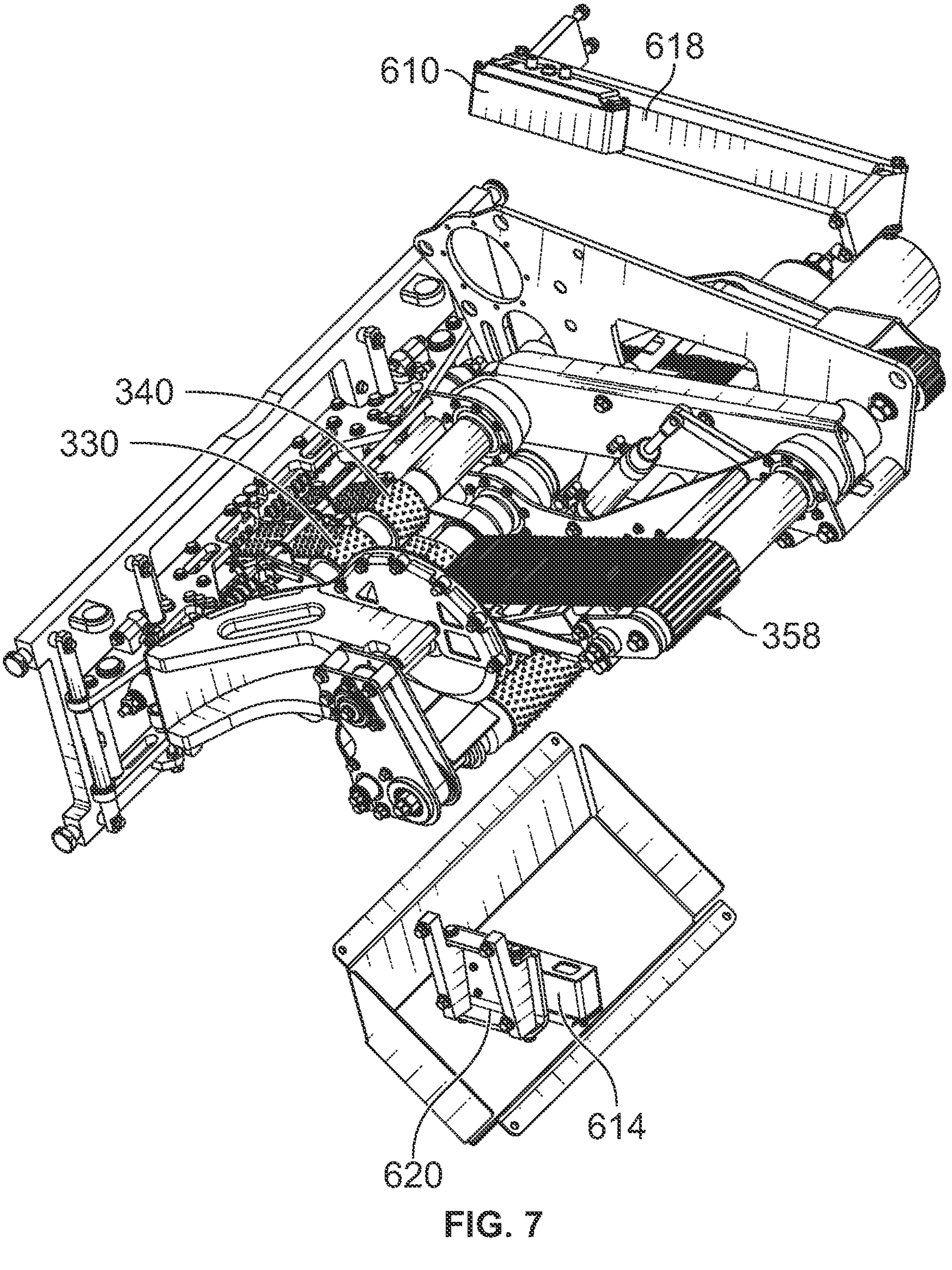
FIG. 7 is a top view of the forward and rearward conveyor assemblies of FIG. 5, particularly showing upper and lower laser scanning assemblies, according to one embodiment.

As best shown in FIGS. 6 and 7, an upper scanner unit 610 is located above the food product in a region proximal the gap 510 and is configured to scan an upper surface of the food product to obtain contour information corresponding to the upper surface of the food product. A similar lower scanner unit 614 may located below the forward and rearward conveyor assemblies, and is preferably located below the food product, in a region proximal the gap 510. The lower scanner unit 614 is configured to scan a lower surface of the food product as the food product passes across the gap 510, to obtain contour information of the lower surface of the food product.

The upper scanner unit 610 may be supported by an upper rail or upper scanner arm 618, which is operatively attached to the main frame 112. Similarly, the lower scanner unit 614 may be supported by a lower rail or lower scanner bracket 620, which is operatively attached to the main frame 112.

Based on the contour information from the upper scanner unit 610 and the lower scanner unit 614, the control system 136 generates profile data or a profile of the food product. The profile data corresponds to each lateral scan line made along the length of the food product. Scan lines may be separated by 1 mm for example, however any suitable resolution may be used depending on the application, and based on the scan rate and forward feed speed of the conveyors. Scan line resolution may range from 0.5 mm to 8 mm, in one embodiment. The profile information may be used to determine the slice thickness to be made.

In one embodiment, the upper scanner unit 610 and the lower scanner unit 614 each include a laser emitter and a corresponding laser receiver incorporated into a self-contained, commercially-available unit, such as for example, a Wenglor MLS235 Profile Sensor. Any suitable scanning device may be used, including non-laser scanners using non-laser optical emitters and corresponding receivers. The upper scanner unit 610 and the lower scanner unit 614, such as the Wenglor MLS235 Profile Sensor, may be further housed within a stainless steel enclosure or box to comply with food safety and hygiene regulatory requirements. Such an enclosure, in one embodiment, includes a light transmission window parallel to and adjacent the emission window of the Wenglor or other scanner unit.

As the food product pass the gap 510 during transport, the upper scanner unit 610 and the lower scanner unit 614 emit an optical beam 630 that laterally scans across a width of the food product. In one embodiment, the optical beam 630 contacts the surface of the food product at an angle of between 4 degrees and 45 degrees relative to a longitudinal axis. Such angle is determined by the physical positioning of the scanner unit along the main frame 112, and the angle that the beam 630 exits the scanning unit. As shown in FIG. 6, the optical beam 630 is shown in the drawing as a representation only, and of course, is not solid as shown. FIG. 6 merely attempts to show the path and angle of the optical beam 630, which is not necessarily drawn to scale.

Further, the upper scanner unit 610 or the lower scanner unit 614, may be offset to the side relative to the longitudinal or feed axis of the food product slicing apparatus 102. Thus, the upper scanner unit 610 or the lower scanner unit 614 need not necessarily be positioned directly above and below the food product, respectively, but may be positioned toward one side or the other for various reasons of support and construction. The optical beam 630 forms a scan line across a width of the food product on both top and bottom sides of the food product, and in one embodiment, the scan line on the food product is located at a distance of between 6 inches to 15 inches from the blade.

As described above, the control system 136 synchronizes movement of the forward conveyor assembly 310 and the rearward conveyor assembly 350, which together, establish an exact known location of the food product on the conveyors, and consequently, the distance from the scan line to the blade. Because the gap 510 is fairly close to the blade and because the forward conveyor assembly 310 and rearward conveyor assembly 350 "grip" top and bottom surfaces of the food product and maintain a precisely known position of the food product on the conveyor, the information corresponding to each scan line at the time that the scan is made corresponds exactly to the known position of the food product as it enters the slicing plane of the slicing blade 210.

Use of the forward conveyor assembly 310 in conjunction with the rearward conveyor assembly 350 to grip the food product minimizes or completely eliminates any tracking error with respect to the position of the food product on the conveyor. Because the scanner units 610, 614 scan the food product between forward conveyor assembly 310 and the rearward conveyor assembly 350 the scan information collected also corresponds to the exact known position of the food product and as the food product continues to travel toward the blade 210. This minimizes or completely eliminates the possibility that the food product could slightly shift position on the conveyor due to normal vibrations and changes in conveyor belt speed, as which may occur with known slicing systems where scanning is performed in a separate unit or is performed well upstream from the blade.

Accordingly, in the embodiments of the invention, for each slice, the profile or contour of that slice is known for the exact longitudinal position of the food product. Based on such information, in one embodiment, the thickness of the slice may be preset at a specific slice thickness based on the known contour. Preferably, based on the contour information, in one embodiment, the slice thickness may be adjusted between portions, where one portion represents multiple slices.

As described above, data from the upper scanner unit 610 and the lower scanner unit 614 for the contour representation of the food product. Such contour representation along the entire length of the food product permits a three-dimensional shape of the food product to be determined. The overall cross-section of the food product, combined with weight feedback via a scale or load cell downstream (after slicing), along with an assumed density of the food product, provides information to the control system 32 to determine what the overall slice thickness will need to be such that the overall slices sliced from a particular section of the food product will be the proper weight. The control system 32 determines the appropriate slice thickness for the desired weight and controls the speed that the forward conveyor assembly 310 and the rearward conveyor assembly 350 are moved in the forward direction, and in synchronization with each other. The upper scanner unit 610 and the lower scanner unit 614, may for example, be an optical emitter and receiver, a laser emitter and receiver, a camera and emitter system, and/or an x-ray emitter and detector.

While a particular embodiment is illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiment illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A food slicing system comprising:
- a frame;
- a blade assembly coupled to the frame and configured to slice a food product;
- a forward conveyor assembly coupled to the frame, including:
  - a lower forward conveyor configured to support a portion of the food product thereon; and
  - at least one upper forward conveyor located above a portion of the lower forward conveyor, wherein the at least one upper forward conveyor is configured to contact an upper surface of the food product;
  - wherein the forward conveyor assembly is configured to transport the food product to the blade assembly;
- a rearward conveyor assembly coupled to the frame and configured to transport the food product to the forward conveyor assembly, and located immediately upstream from the forward conveyor assembly, wherein a gap is formed laterally between the forward conveyor assembly and the rearward conveyor assembly, in the longitudinal direction;
- a control system configured to control and synchronize movement of the forward conveyor assembly and the rearward conveyor assembly;
- an upper scanner unit located above the food product in a region proximal the gap and configured to scan an upper surface of the food product to obtain contour information of the upper surface of the food product;
- a lower scanner unit located below the forward and rearward conveyor assemblies, and located below the food product, in a region proximal the gap, and configured to scan a lower surface of the food product as the food product passes across the gap, to obtain contour information of the lower surface of the food product; and
- wherein the control system is configured to receive the contour information from the upper scanner unit and the lower scanner unit and generate a profile of the food product.

2. The food slicing system according to claim 1, wherein the lower forward conveyor and the at least one upper forward conveyor contact the food product on bottom and top surfaces thereof, respectively, and transport the food product in the forward direction, and wherein the lower forward conveyor and the at least one upper forward conveyor are controlled to move in synchronization by the control system.

3. The food slicing system according to claim 1, wherein the rearward conveyor assembly includes:
- a lower rearward conveyor configured to support a portion of the food product thereon; and
- an upper rearward conveyor located above a portion of the lower rearward conveyor, wherein the upper rearward conveyor is configured to contact an upper surface of the food product.

4. The food slicing system according to claim 1, wherein the lower rearward conveyor and the upper rearward conveyor contacts the food product on bottom and top surfaces thereof, respectively, and transports the food product in the forward direction, and wherein the lower rearward conveyor and the upper rearward conveyors are controlled to move in synchronization by the control system.

5. The food slicing system according to claim 1, wherein the upper scanner unit and the lower scanner unit each include a laser emitter and a corresponding laser receiver.

6. The food slicing system according to claim 1, wherein the upper scanner unit and the lower scanner unit emit an optical beam that laterally scans across a width of the food product, wherein the beam contacts the surface of the food product at an angle of between 4 degrees and 45 degrees relative to a longitudinal axis.

7. The food slicing system according to claim 6, wherein the optical beam forms a scan line across a width of the food product, wherein the scan line on the food product is located at a distance of between 6 inches to 15 inches from the blade.

8. The food slicing system according to claim 7, wherein synchronized forward movement of the lower forward conveyor and the at least one upper forward conveyor establishes a known distance from the scan line to the blade.

9. A food slicing system having a main frame, the system comprising:
- a blade assembly coupled to the main frame and configured to slice a food product;
- a forward conveyor assembly coupled to the main frame and configured to transport the food product to the blade assembly to be sliced, the forward conveyor assembly including:
  - a lower forward conveyor configured to support a portion of the food product thereon; and
  - at least one upper forward conveyor located above a portion of the lower forward conveyor, wherein the at least one upper forward conveyor is configured to contact an upper surface of the food product;
- a rearward conveyor assembly coupled to the main frame and configured to transport the food product to the forward conveyor assembly, and located immediately upstream from the forward conveyor assembly, wherein a gap is formed laterally between the forward conveyor assembly and the rearward conveyor assembly, in the longitudinal direction;

an upper scanner unit located above the food product in a region proximal the gap and configured to scan an upper surface of the food product to obtain contour information of the upper surface of the food product; and a lower scanner unit located below the forward and rearward conveyor assemblies, and located below the food product, in a region proximal the gap and configured to scan a lower surface of the food product as the food product passes across the gap, to obtain contour information of the lower surface of the food product.

10. The food slicing system according to claim 9, further including a control system configured to control and synchronize movement of the forward conveyor assembly and the rearward conveyor assembly.

11. The food slicing system according to claim 9, wherein the control system is configured to receive the contour information from the upper scanner unit and the lower scanner unit to generate a profile of the food product.

12. The food slicing system according to claim 9, wherein the lower forward conveyor and the at least one upper forward conveyor contact the food product on bottom and top surfaces thereof, respectively, and transport the food product in the forward direction, and wherein the lower forward conveyor and the at least one upper forward conveyor are controlled to move in synchronization by the control system.

13. The food slicing system according to claim 9, wherein the rearward conveyor assembly includes:

a lower rearward conveyor configured to support a portion of the food product thereon; and an upper rearward conveyor located above a portion of the lower rearward conveyor, wherein the upper rearward conveyor is configured to contact an upper surface of the food product.

14. The food slicing system according to claim 9, wherein the lower rearward conveyor and the upper rearward conveyor contacts the food product on bottom and top surfaces thereof, respectively, and transports the food product in the forward direction, and wherein the lower rearward conveyor and the upper rearward conveyors are controlled to move in synchronization by the control system.

15. The food slicing system according to claim 9, wherein the upper scanner unit and the lower scanner unit each include a laser emitter and a corresponding laser receiver.

16. The food slicing system according to claim 9, wherein the upper scanner unit and the lower scanner unit emit an optical beam that laterally scans across a width of the food product, wherein the beam contacts the surface of the food product at an angle of between 4 degrees and 45 degrees relative to a longitudinal axis.

17. The food slicing system according to claim 16, wherein the optical beam forms a scan line across a width of the food product, wherein the scan line on the food product is located at a distance of between 6 inches to 15 inches from the blade.

18. The food slicing system according to claim 16, wherein synchronized forward movement of the lower forward conveyor and the at least one upper forward conveyor establishes a known distance from the scan line to the blade.

19. A food slicing system having a main frame and a blade assembly configured to slice a food product, the system comprising:

a forward conveyor assembly having upper and lower conveyors, the forward conveyor assembly located proximal to the blade assembly;

a rearward conveyor assembly having upper and lower conveyors, located immediately upstream from the forward conveyor assembly, wherein a gap is formed laterally between the forward conveyor assembly and the rearward conveyor assembly, in the longitudinal direction;

an upper scanner unit located above the food product in a region proximal the gap and configured to scan an upper surface of the food product to obtain contour information of the upper surface of the food product; and a lower scanner unit located below the forward and rearward conveyor assemblies, and located below the food product, in a region proximal the gap and configured to scan a lower surface of the food product as the food product passes across the gap, to obtain contour information of the lower surface of the food product.

20. A food slicing system comprising:

a frame;

a blade assembly coupled to the frame and configured to slice a food product;

a forward conveyor assembly coupled to the frame and configured to transport the food product to the blade assembly, a front end of the forward conveyor assembly located proximal to the blade assembly;

a rearward conveyor assembly coupled to the frame and configured to transport the food product to the forward conveyor assembly, and located immediately upstream from the forward conveyor assembly, wherein a gap is formed laterally between the forward conveyor assembly and the rearward conveyor assembly, in the longitudinal direction;

a control system configured to control and synchronize movement of the forward conveyor assembly and the rearward conveyor assembly;

an upper scanner unit located above the food product in a region proximal the gap and configured to scan an upper surface of the food product to obtain contour information of the upper surface of the food product;

a lower scanner unit located below the forward and rearward conveyor assemblies, and located below the food product, in a region proximal the gap, and configured to scan a lower surface of the food product as the food product passes across the gap, to obtain contour information of the lower surface of the food product; and wherein the upper scanner unit and the lower scanner unit emit an optical beam that laterally scans across a width of the food product, and wherein the control system is configured to receive the contour information from the upper scanner unit and the lower scanner unit and generate a profile of the food product.

* * * * *